United States Patent
Eglin et al.

(10) Patent No.: US 11,608,165 B2
(45) Date of Patent: Mar. 21, 2023

(54) METHOD OF PROVIDING TORQUE PROTECTION AND/OR THRUST PROTECTION FOR PROPELLERS OF A HYBRID HELICOPTER, AND A HYBRID HELICOPTER

(71) Applicant: AIRBUS HELICOPTERS, Marignane (FR)

(72) Inventors: Paul Eglin, Roquefort la Bedoule (FR); Remy Huot, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 108 days.

(21) Appl. No.: 17/169,668

(22) Filed: Feb. 8, 2021

(65) Prior Publication Data
US 2021/0291975 A1 Sep. 23, 2021

(30) Foreign Application Priority Data

Mar. 18, 2020 (FR) ...................... 2002653

(51) Int. Cl.
*B64C 27/78* (2006.01)
*B64C 27/00* (2006.01)
(Continued)

(52) U.S. Cl.
CPC ............ *B64C 27/78* (2013.01); *B64C 11/303* (2013.01); *B64C 11/34* (2013.01); *B64C 27/008* (2013.01); *B64C 27/22* (2013.01); *B64C 27/57* (2013.01)

(58) Field of Classification Search
CPC ........ B64C 11/303; B64C 11/34; B64C 27/22
See application file for complete search history.

(56) References Cited

U.S. PATENT DOCUMENTS

| | | |
|---|---|---|
| 8,052,094 B2 | 11/2011 | Roesch |
| 8,113,460 B2 | 2/2012 | Roesch |

(Continued)

FOREIGN PATENT DOCUMENTS

| | | |
|---|---|---|
| EP | 2258615 A1 | 12/2010 |
| EP | 2574547 A1 | 4/2013 |
| FR | 2946315 A1 | 12/2010 |

OTHER PUBLICATIONS

French Search Report for French Application No. FR2002653, Completed by the French Patent Office, dated Nov. 20, 2020, 8 pages.

*Primary Examiner* — Timothy D Collins
*Assistant Examiner* — Eric Acosta
(74) *Attorney, Agent, or Firm* — Brooks Kushman P.C.

(57) ABSTRACT

A method of providing torque protection and/or thrust protection for the or each propeller of a hybrid helicopter. The hybrid helicopter includes a control system connected to the blades of each propeller and a thrust control configured to generate an order for modifying a pitch of the blades, which order is transmitted to the control system, the propeller(s) being driven in rotation by a mechanical transmission system of the hybrid helicopter. The method includes a step of having the control system keep the pitch of the blades of a propeller within at least one control envelope relating to a thrust generated by the propeller or to a torque exerted in the mechanical transmission system. In this way, the pitch of the blades of each propeller is kept between a lower limit and an upper limit of the control envelope.

17 Claims, 2 Drawing Sheets

(51) Int. Cl.
*B64C 27/22* (2006.01)
*B64C 27/57* (2006.01)
*B64C 11/30* (2006.01)
*B64C 11/34* (2006.01)

(56) References Cited

U.S. PATENT DOCUMENTS

| | | |
|---|---|---|
| 8,170,728 B2 | 5/2012 | Roesch |
| 8,181,901 B2 | 5/2012 | Roesch |
| 2008/0237392 A1 | 10/2008 | Piasecki et al. |
| 2010/0310371 A1* | 12/2010 | Eglin .................. G05D 1/0858 |
| | | 701/3 |
| 2010/0312421 A1 | 12/2010 | Eglin |
| 2013/0079956 A1 | 3/2013 | Eglin |

* cited by examiner

METHOD OF PROVIDING TORQUE PROTECTION AND/OR THRUST PROTECTION FOR PROPELLERS OF A HYBRID HELICOPTER, AND A HYBRID HELICOPTER

CROSS-REFERENCE TO RELATED APPLICATIONS

This application claims the benefit of FR 20 02653 filed on Mar. 18, 2020, the disclosure of which is incorporated in its entirety by reference herein.

BACKGROUND OF THE INVENTION

(1) Field of the Invention

The present invention relates to a method of providing torque protection and/or thrust protection for propellers of a hybrid helicopter, and also to a hybrid helicopter applying this method. The invention lies in the technical field of control systems for a hybrid helicopter.

The project leading to this invention received funding from the European Union Framework Programme for Research and Innovation Horizon 2020, through the grant agreement CleanSky 2 No. GAM-FRC-2014-001 Issue E.

(2) Description of the Related Art

One type of rotorcraft may, due to its specificity and for convenience, be referred to as a "hybrid helicopter". A hybrid helicopter has a fuselage carrying at least one rotary wing provided with a rotor, that rotor being referred to, for convenience, as a "lift rotor" due to a function it performs. The lift rotor participates at least in providing lift for the aircraft, and indeed can also participate in providing forward propulsion for it.

A hybrid helicopter further includes at least one propeller, possibly of the puller propeller type or of the pusher propeller type. For example, a hybrid rotorcraft may be provided with at least two propellers arranged transversely on either side of the fuselage.

Furthermore, a hybrid helicopter includes a power plant for setting in motion each propeller and the lift rotor, optionally continuously except during failures or during testing.

To pilot a hybrid helicopter, a pilot of the hybrid helicopter can operate a first control and a second control for respectively collectively and cyclically controlling the pitch of the blades of the lift rotor, e.g. via a mechanical and/or electrical architecture. The first control is referred to, for convenience, as the "collective pitch control" and often takes the form of a lever referred to as the "collective pitch lever". The second control is referred to, for convenience, as the "cyclic pitch control" and often takes the form of a stick referred to as the "cyclic stick".

The hybrid helicopter also includes at least one thrust control acting on each propeller and controlling the forward movement of the hybrid helicopter at least in part. The at least one thrust control is suitable for modifying the pitch value of the blades of each propeller in common manner, e.g. via a mechanical and/or electrical architecture.

The hybrid helicopter also has steering or "directional" control functions, and in particular a yaw control. For example, such a yaw control may comprise pedals connected via a mechanical and/or electrical architecture to each propeller.

When a hybrid helicopter includes at least two propellers situated on either side of the fuselage, said at least two propellers may be controlled differentially so as to participate firstly in the forward propulsion of the hybrid helicopter and secondly in the yaw control of the hybrid helicopter. In this situation, the pitch of the blades of each propeller comprises a mean pitch component and a differential pitch component. Thus, the first pitch of the first blades of a first propeller may be equal to the sum of the mean pitch component plus the differential pitch component while the second pitch of the second blades of a second propeller may be equal to the mean pitch component minus the differential pitch component. Furthermore, the mean pitch component may be equal to the half-sum of the first and second pitches of the two propellers while the differential pitch component may be equal to the half-difference of the first and second pitches of the two propellers.

In such a situation, the thrust control is suitable for modifying the value of the mean pitch component while the yaw control is suitable for modifying the value of the differential pitch component of the propellers, e.g. via pedals.

For example, the thrust control may be in the form of a lever or of a button that transmits an analog or digital and electrical or optical signal, to one or more actuators In one example, such a button may have three discrete states, namely a "beep+" first state requesting an increase in the value of the mean pitch component, a "beep−" second state requesting a reduction in the value of the mean pitch component, and a third state requesting no change in the value of the mean pitch component. The pitches of the blades of the propellers are then increased so long as a pilot positions the button in its first state. In another example, the button may be in the form of a knurled wheel that transmits an analog signal to at least one actuator for the purpose of finely adjusting the mean pitch component of the pitches of the first and second blades.

Examples of hybrid helicopters are disclosed, for example, in Documents U.S. Pat. Nos. 8,181,901, 8,170,728, 8,052,094, and 8,113,460.

Furthermore, the pitches of the propellers may be bounded to guarantee that the hybrid helicopter achieves target performance and/or maneuverability and/or resistance to aerodynamic loads, and in order to avoid, in particular, exceeding the aerodynamic or mechanical limits of the hybrid helicopter.

For example, Document FR 2 946 315 discloses a method of controlling and regulating the pitch of the blades of each propeller of a hybrid helicopter, that method aiming to protect the aircraft, and in particular the mechanical transmission system that drives each propeller in rotation. That method regulates, in particular, the pitch of the blades of each propeller in order to avoid exceeding maximum mechanical limits relating to the speed of rotation of said blades, to the power consumed by each propeller, or indeed to the torque exerted in the mechanical transmission system that drives each propeller.

Furthermore, Document EP 2 258 615 discloses a piloting assistance device for a hybrid helicopter, that device determining a maximum mean pitch applicable to the blades of the propellers of the hybrid helicopter without exceeding the power available for those propellers. The maximum mean pitch is determined as a function of the current mean pitch of the blades of the propellers, of a maximum power that can be delivered by a power plant that drives the propellers, of a current power being delivered by said power plant, and of a relationship determining a power gradient as a function of the pitches of the propellers.

The technological background of the invention also includes Documents EP 2 574 547 and US 2008/0237392.

BRIEF SUMMARY OF THE INVENTION

An object of the present invention is therefore to propose an innovative method of optimizing the protection for each propeller of a hybrid helicopter and/or for the mechanical transmission system that drives the blades of each propeller.

The present invention is designed for rotary-wing aircraft that are provided with at least one propeller, i.e. it is designed for hybrid helicopters.

A further object of the present invention is to propose a hybrid helicopter that is configured to implement this method.

Thus, the invention provides a method of providing torque protection and/or thrust protection for at least one propeller of a hybrid helicopter, the hybrid helicopter including a lift rotor and at least one propeller, the hybrid helicopter including a control system connected to blades of said at least one propeller, the hybrid helicopter having a thrust control configured to generate an order for modifying a pitch of the blades of said at least one propeller, which order is transmitted to the control system, said blades of said at least one propeller being driven in rotation by a mechanical transmission system of the hybrid helicopter.

This method includes the following step:
having the control system keep the pitch of the blades of said at least one propeller within at least one control envelope relating to a characteristic of this at least one propeller and defined by limits for this characteristic, this characteristic being a thrust generated by this at least one propeller or a torque exerted in the mechanical transmission system of the hybrid helicopter.

For example, the mechanical transmission system driving the blades of each propeller in rotation includes one or more fuel-burning engines and/or one or more electric motors, a main gearbox, one or more auxiliary gearboxes, connecting shafts, and transmission shafts driving the blades of each propeller in rotation.

Furthermore, a hybrid helicopter may include a computer configured to implement the method of the invention.

For example, the computer may be dedicated to implementing this method of the invention or indeed it may be shared for performing other functions of the aircraft and, in that capacity, it may be integrated into an avionics system of the aircraft. For example, the computer may comprise at least one processor and at least one memory, at least one integrated circuit, at least one programmable system or indeed at least one logic circuit, these examples not limiting the scope given to the expression "computer". For example, the memory may store one or more segments of codes or algorithms for the purpose of implementing the method of the invention, as well as one or more databases.

Regardless of the manner of implementing the method, the pitch of the blades of each propeller is bounded at each instant so as to be present continuously within at least one control envelope relating to a characteristic of said propeller. For example, a characteristic is a thrust generated by the propeller or else a torque exerted in the mechanical transmission system of the hybrid helicopter.

Furthermore, the thrust generated by the propeller may be the thrust per se or a "reduced" thrust equal to the thrust generated by the propeller divided by the product $\rho.S.v^2$, where $\rho$ is the density (mass per unit volume) of the air;
where S is the cumulative surface area of the blades of the propeller; and
where v is the forward speed or velocity of the hybrid helicopter.

This reduced thrust is advantageously independent of the atmospheric conditions and in particular of the temperature and of the current atmospheric pressure outside the hybrid helicopter.

Thus, a control envelope relating to a characteristic of a propeller may cover pitch values for the blades of said propeller that are allowed as a function of the forward speed of the hybrid helicopter.

Each control envelope relating to a characteristic of a propeller may, in particular, be bounded by an upper limit and by a lower limit for the characteristic in question in a control diagram plotting the pitch of the blades of a propeller along the abscissa axis and the characteristic of the propeller up the ordinate axis, or vice versa. The control diagram includes a set of curves defining the characteristic as a function of the pitch of the blades of the propeller, each curve being associated with a forward speed of the hybrid helicopter or indeed with a range of speeds.

The step of keeping the pitch within the control envelope then includes the following steps at each iteration:
keeping the pitch of the blades below the upper limit as a function of the forward speed of the hybrid helicopter; and
keeping the pitch of the blades above the lower limit as a function of the forward speed of the hybrid helicopter.

The upper and lower limits may lie within the allowable envelope for the pitch of the blades. Indeed, while the pitch of the blades is being kept below the upper limit or above the lower limit, the pitch of the blades may be equal respectively to the upper limit or to the lower limit.

The upper and lower limits of a characteristic of a propeller may be defined by trials, computations and/or simulations. Similarly, the curves defining the characteristic as a function of the pitch of the blades of the propeller and of the forward speed of the hybrid helicopter may be defined by trials, computations and/or simulations. The lower and upper limits of each characteristic as well as the associated curves may be stored in one or more databases, e.g. in a memory of the computer or in a memory connected to the computer. For example, a database may include tables of values, a succession of mathematical instructions, or indeed one or more equations corresponding to said curves and to said upper and lower limits of each characteristic. A database may also include a numerical simulation algorithm putting, in particular, the characteristic of a propeller, the pitch of the blades, and the forward speed relative to air of the hybrid helicopter into a relationship with one another.

When the characteristic of a propeller is the thrust of the propeller or indeed the reduced thrust, the upper and lower limits are associated mainly with aerodynamic limits of the propeller aiming to avoid aerodynamic stalling of the blades and an ensuing rapid reduction in the thrust generated by said propeller. Such aerodynamic stalling of the blades of a propeller can occur equally well for positive pitch values corresponding to generation of a forward thrust for the hybrid helicopter as for negative pitch values corresponding to generation of rearward thrust for the hybrid helicopter. When the blades of a propeller are twisted and/or when their profiles are cambered, the phenomenon of stalling does not occur symmetrically for the positive and negative pitches. The upper and lower limits are thus not necessarily mutually opposite.

A margin, e.g. equal to from 5% to 10% of the value of the limit, may be used relative to the real pitch value leading to aerodynamic stalling for the purpose of defining the upper and lower limits relating to the thrust of the propeller. The upper and lower limits thus correspond respectively to a maximum usable thrust and to a minimum usable thrust for said propeller without any risk of stalling and thus without any risk of loss of thrust.

When the characteristic of a propeller is the torque exerted in the mechanical transmission system driving the blades of the propeller, the upper and lower limits are associated with mechanical limits relating to said mechanical transmission system of the hybrid helicopter and they correspond to pitches of the blades of the propeller that are close to causing a mechanical degradation or a mechanical breakage, or indeed mechanical fatigue that might ultimately cause a mechanical degradation or a mechanical breakage in the mechanical transmission system. The consequences of such a mechanical degradation or breakage are a reduction in or indeed a loss of thrust from the propeller, and possibly a degradation in or a loss of operating at the lift rotor of the hybrid helicopter.

This mechanical degradation or breakage can, for example, be breakage of a transmission shaft or of a connecting shaft, or indeed breakage of gears inside a main gearbox or an auxiliary gearbox. Such a mechanical degradation or breakage can also be breakage of a "fuse" element of the mechanical transmission system, thereby preventing transmission of any mechanical power, but also protecting the other elements in the mechanical transmission system.

Such mechanical degradation or breakage can occur for positive pitch values corresponding to generation of a forward thrust or for negative pitch values corresponding to generation of rearward thrust for the hybrid helicopter, the propeller then still being in drive mode. Such a mechanical degradation or breakage can also occur while mechanical power is being generated by the airflow sweeping over the blades of the propeller, the propeller than being in power generator mode. In such a situation, the lower and upper limits may be substantially opposite if the mechanical transmission system has been dimensioned to operate reversibly, i.e. to transmit mechanical power to the propeller and to receive mechanical power from the propeller in substantially similar manner.

Generally, the mechanical transmission system, and in particular the main gearbox and each auxiliary gearbox, have been designed and dimensioned mainly to transmit mechanical power from an engine to a propeller. Therefore, the gears of said gearboxes are dimensioned for this purpose with high allowable torque in one operating direction, and they therefore do not behave symmetrically. Therefore, the upper and lower limits of said characteristic are then not opposite and the absolute value of the lower limit is significantly lower than the absolute value of the upper limit.

Here too, a margin, e.g. equal to from 5% to 10% of the value of the limit, may be used relative to the allowable limits at mechanical breakage of the mechanical transmission system so as to define the upper and lower limits relating to the torque exerted in the mechanical transmission system. The upper and lower limits thus correspond respectively to a maximum allowable torque and to a minimum allowable torque for said propeller without any risk of mechanical degradation or breakage of the mechanical transmission system of the hybrid helicopter.

An upper or lower limit may be constant and may be independent of the forward speed relative to air or "airspeed" of the hybrid helicopter. For example, the upper and lower limits relating to the torque exerted in the mechanical transmission system may be constant. An upper or lower limit may also be variable as a function of the forward speed relative to air of the hybrid helicopter. For example, the upper and lower limits relating to the thrust from a propeller may be variable as a function of the forward speed relative to air of the hybrid helicopter.

Below, the forward speed relative to air of the hybrid helicopter is referred to for convenience as the "forward speed".

In this way, the method of the invention may make it possible automatically to protect the mechanical transmission system driving the blades of a propeller by avoiding going beyond an upper limit or beyond a lower limit relating to the torque exerted in said mechanical transmission system, and preventing reaching a pitch of the blades of the propeller that leads to a torque greater than a maximum allowable torque or less than a minimum allowable torque.

Similarly, the method of the invention may make it possible automatically to protect the advancing of the hybrid helicopter by avoiding a reduction in or a loss of thrust from a propeller due to aerodynamic stalling of the blades of the propeller.

The method may also have one or more of the following characteristics.

In one aspect, when the pitch of the blades reaches the upper limit, keeping the pitch below the upper limit may include the following step at each iteration:

preventing any increase in the pitch in absolute value when the forward speed of the hybrid helicopter does not increase above the forward speed reached when the pitch of the blades reaches the upper limit.

Indeed, an increase in the pitch of the blades of a propeller at constant forward speed, while the current pitch of the blades is substantially equal to the upper limit, would give rise to a pitch value greater than the upper limit. The method advantageously avoids this situation when the pilot is acting on the thrust control of the propeller to increase the thrust, and thus to increase the pitch of the blades of the propeller without increasing the forward speed of the hybrid helicopter relative to said forward speed reached when the pitch of the blades reaches the upper limit.

Conversely, if the forward speed increases, without any modification in the pitch of the blades of the propeller, said pitch moves away from the upper limit into the control envelope. The pilot can therefore then increase said pitch if desired, the method guaranteeing it remains below the upper limit. Increasing the forward speed without modifying pitch can, for example, be obtained by acting on the cyclic pitch of the lift rotor or indeed by causing the hybrid helicopter to fly downwards.

In one aspect, when the pitch of the blades reaches the upper limit, keeping the pitch below the upper limit may include the following step at each iteration:

reducing the pitch in absolute value when the forward speed of the hybrid helicopter decreases below the forward speed reached when the pitch of the blades reaches the upper limit.

Indeed, a decrease in the forward speed without any modification in the pitch of the blades of a propeller, while the current pitch of the blades is substantially equal to the upper limit, would give rise to a pitch value greater than the upper limit. The method advantageously avoids this situation by accompanying the decrease in the forward speed of the hybrid helicopter in order to keep the current pitch substantially equal to the upper limit. Decreasing the forward speed without modifying the pitch can, for example, be obtained by acting on the cyclic pitch of the lift rotor or indeed by causing the hybrid helicopter to fly upwards.

In one aspect, when the pitch of the blades reaches the lower limit, keeping the pitch above the lower limit may include the following step at each iteration:

preventing any reduction in the pitch when the forward speed of the hybrid helicopter does not decrease below the forward speed reached when the pitch of the blades reaches the lower limit.

Indeed, a reduction in the pitch of the blades of a propeller at constant forward speed, while the current pitch of the blades is substantially equal to the lower limit, would give rise to a pitch value less than the lower limit. The method advantageously avoids this situation when the pilot acts on the thrust control of the propeller to decrease the thrust, and thus to decrease the pitch of the blades of the propeller without decreasing the forward speed of the hybrid helicopter relative to the forward speed reached when the pitch of the blades reaches the lower limit.

Conversely, if the forward speed decreases, without any modification in the pitch of the blades of the propeller, said pitch moves away from the lower limit into the control envelope and the pilot can then reduce said pitch if desired, the method guaranteeing the pitch stays above the lower limit.

In one aspect, when the pitch of the blades reaches the lower limit, keeping the pitch above the lower limit may include the following step at each iteration:

increasing the pitch when the forward speed of the hybrid helicopter increases above the forward speed reached when the pitch of the blades reaches the lower limit.

Indeed, an increase in the forward speed without any modification in the pitch of the blades of a propeller, while the current pitch of the blades is substantially equal to the lower limit, would give rise to a pitch value less than the lower limit. The method advantageously avoids this situation by accompanying the increase in the forward speed with an increase in pitch in order to keep the current pitch substantially equal to the lower limit.

In this way, the method makes it possible to protect the mechanical transmission system driving the blades of each propeller and/or to protect the advancing of the helicopter regardless of the control exerted by the pilot of the hybrid helicopter.

In another aspect, when the characteristic of the propeller is the torque exerted in the mechanical transmission system of the hybrid helicopter, the step of keeping the pitch within the control envelope may include the following steps at each iteration:

computing a maximum pitch $\beta_{Torque-max}$ for the blades of the propeller relating to a maximum allowable torque for a current forward speed of the hybrid helicopter; and computing a minimum pitch $\beta_{Torque-min}$ for the blades of the propeller relating to a minimum allowable torque for the current forward speed of the hybrid helicopter.

The maximum pitch $\beta_{Torque-max}$ and the minimum pitch $\beta_{Torque-min}$ may be defined, for the current forward speed of the hybrid helicopter, on the control diagram, respectively by the intersection where the upper limit intersects a curve determining the torque as a function of the pitch of the blades of the propeller, and by the intersection where the lower limit intersects the same curve. The maximum pitch $\beta_{Torque-max}$ and the minimum pitch $\beta_{Torque-min}$ may also be defined by a computer as a function of information from a database. The minimum allowable torque is a negative defined torque corresponding to the mechanical limit of operation of the mechanical transmission system when a propeller is in a generator mode generating mechanical power. The maximum allowable torque is a positive defined torque corresponding to the mechanical limit of operation of the mechanical transmission system when a propeller is in a drive mode in which it consumes mechanical energy.

Similarly, when the characteristic of the propeller is the thrust from the propeller, the step of keeping the pitch within the control envelope may include the following steps at each iteration:

computing a maximum pitch $\beta_{Thrust-max}$ for the blades of the propeller relating to a maximum usable thrust for the current forward speed of the hybrid helicopter; and computing a minimum pitch $\beta_{Thrust-min}$ for the blades of the propeller relating to a minimum usable thrust for the current forward speed of the hybrid helicopter.

The maximum pitch $\beta_{Thrust-max}$ and the minimum pitch $\beta_{Thrust-min}$ may be defined, for the current forward speed of the hybrid helicopter, on the control diagram, respectively by the intersection where the upper limit intersects a curve determining the thrust from the propeller as a function of the pitch of the blades of the propeller, and by the intersection where the lower limit intersects the same curve. The maximum pitch $\beta_{Thrust-max}$ and the minimum pitch $\beta_{Thrust-min}$ may also be defined by a computer as a function of information from a database.

In one aspect, the control system may include a control computer receiving at least one thrust control signal directly or indirectly from the thrust control, the control computer controlling at least one actuator of the control system. Keeping the pitch within the control envelope includes a step of having the control computer control said at least one actuator as a function at least of a law stored in a memory as well as at least of the thrust control signal. The law stored in a memory may come from a database and may be used by the control computer.

In one aspect, the step of having the control computer control said at least one actuator may also use the maximum pitch $\beta_{Torque-max}$ relating to the maximum allowable torque and the minimum pitch $\beta_{Torque-min}$ relating to the minimum allowable torque for the blades of the propeller for the current forward speed of the hybrid helicopter.

The step of having the control computer control said at least one actuator may also use the maximum pitch $\beta_{Thrust-max}$ relating to the maximum usable thrust and the minimum pitch $\beta_{Thrust-min}$ relating to the minimum usable thrust for the current forward speed of the hybrid helicopter.

Finally, the step of having the control computer control said at least one actuator may use a yaw control signal issued directly or indirectly by a yaw control acting on the pitch of the blades of each propeller, e.g. when the hybrid helicopter includes at least two propellers.

In once aspect, the method of providing torque protection and thrust protection for at least one propeller of a hybrid helicopter may include additional steps aiming to compute a maximum overall mean pitch $\beta_{TCC-Complete-max}$ and a minimum overall mean pitch $\beta_{TCC-Complete-min}$ relating to the usable thrust and to the allowable torque for each propeller for the current forward speed of the hybrid helicopter.

When the hybrid helicopter includes a single propeller, the method of the invention may then include the following steps at each iteration:

computing a maximum overall mean pitch $\beta_{TCC-Complete-max}$ relating to the maximum usable thrust and to the maximum allowable torque for the propeller for the current forward speed of the hybrid helicopter, the maximum overall mean pitch $\beta_{TCC-Complete-max}$ of the propeller being defined as a function of the maximum pitch $\beta_{Thrust-max}$ of the propeller relating to the maximum usable thrust and of the maximum pitch $\beta_{Torque-max}$ relating to the maximum allowable torque for the propeller; and computing a minimum overall mean pitch $\beta_{TCC-Complete-min}$ relating to the minimum usable thrust and to the minimum allowable torque for the propeller, for the current forward speed of the hybrid helicopter, the minimum overall mean pitch $\beta_{TCC-Complete-min}$ of the propeller being defined as a function of the minimum pitch $\beta_{Thrust-min}$ relating to the minimum usable thrust from the propeller and of the minimum pitch $\beta_{Torque-min}$ relating to the minimum allowable torque for the propeller.

When the hybrid helicopter includes at least two propellers, the method of the invention may then include the following steps at each iteration:

computing a maximum overall mean pitch $\beta_{TCC-Complete-max}$ relating to the maximum usable thrust and to the maximum allowable torque for the propellers for the current forward speed of the hybrid helicopter, the maximum overall mean pitch $\beta_{TCC-Complete-max}$ of the propellers being defined as a function of the maximum pitch $\beta_{Thrust-max}$ relating to the maximum usable thrust from each of said propellers and of the maximum pitch $\beta_{Torque-max}$ relating to the maximum allowable torque for each of said propellers; and computing a minimum overall mean pitch $\beta_{TCC-Complete-min}$ relating to the minimum usable thrust and to the minimum allowable torque for the propellers for the current forward speed of the hybrid helicopter, the minimum overall mean pitch $\beta_{TCC-Complete-min}$ of the propellers being defined as a function of the minimum pitch $\beta_{Thrust-min}$ of each of the propellers relating to the minimum usable thrust and of the minimum pitch $\beta_{Torque-min}$ relating to the minimum allowable torque for each of the propellers.

Each minimum or maximum overall mean pitch thus corresponds to the value of the maximum or minimum pitch that can be commanded by the thrust control of the control system of the hybrid helicopter. Each overall mean pitch advantageously takes into account simultaneously the limit relating to the thrust and the limit relating to the torque for each propeller of the hybrid helicopter. Thus, if the hybrid helicopter includes at least two propellers, each minimum or maximum overall mean pitch advantageously takes into account simultaneously the limit relating to the thrust and the limit relating to the torque for all of the propellers of the hybrid helicopter, and then constitutes a pitch limit that is common to all of the propellers of the hybrid helicopter.

Furthermore, the control system includes a control computer receiving at least one thrust control signal directly or indirectly from the thrust control, with the control computer controlling at least one actuator of the control system, and the keeping the pitch within the control envelope includes a step of having the control computer control said at least one actuator as a function at least of a law stored in a memory as well as at least of the thrust control signal, of the maximum overall mean pitch $\beta_{TCC-Complete-max}$ relating to the maximum usable thrust and to the maximum allowable torque, and of the minimum overall mean pitch $\beta_{TCC-Complete-min}$ relating to the minimum usable thrust and to the minimum allowable torque depending on the current forward speed of the hybrid helicopter. The law stored in a memory may come from a database and may be used by the control computer.

In this way, the thrust control of the hybrid helicopter is bounded by the maximum overall mean pitch $\beta_{TCC-Complete-max}$ and by the minimum overall mean pitch $\beta_{TCC-Complete-min}$.

The step of having the control computer control said at least one actuator may also use a yaw control signal issued directly or indirectly by a yaw control acting on the pitch of the blades of each propeller, e.g. when the hybrid helicopter includes at least two propellers.

In one aspect, the maximum overall mean pitch $\beta_{TCC-Complete-max}$ may be equal to the minimum value from among the maximum pitch $\beta_{Thrust-max}$ relating to the maximum usable thrust and the maximum pitch $\beta_{Torque-max}$ relating to the maximum allowable torque for each propeller, while the minimum overall mean pitch $\beta_{TCC-Complete-min}$ is equal to the maximum value from among the minimum pitch $\beta_{Thrust-min}$ relating to the minimum usable thrust and the minimum pitch $\beta_{Torque-min}$ relating to the minimum allowable torque for each propeller.

In one aspect, when the hybrid helicopter includes a first propeller and a second propeller, with the control system being connected to first blades of the first propeller and to second blades of the second propeller, the step of computing a maximum overall mean pitch $\beta_{TCC-Complete-max}$ may then include the following substeps:

measuring a first current pitch $\beta_L$ of the first blades of the first propeller, and a second current pitch $\beta_R$ of the second blades of the second propeller, which pitches are measured, for example, by sensors positioned on the flight controls of the hybrid helicopter or indeed on the control shafts for controlling the pitch of said blades;

computing a first maximum computation pitch relating to the maximum usable thrust for the first propeller using the following relationship:

$$\beta_{TCC-L-Thrust-max} = \frac{\beta_{L-Thrust-max} + \beta_R}{2},$$

where $\beta_{L-Thrust-max}$ is the maximum pitch of the first blades relating to the maximum usable thrust for the first propeller;

computing a second maximum computation pitch relating to the maximum usable thrust for the second propeller using the following relationship:

$$\beta_{TCC-R-Thrust-max} = \frac{\beta_L \beta_{R-Thrust-max}}{2},$$

where $\beta_{R-Thrust-max}$ is the maximum pitch of the second blades relating to the maximum usable thrust for the second propeller;

computing a maximum computation mean pitch relating to the maximum usable thrust for the two propellers using the following relationship:

$$\beta_{TCC-Thrust-max-NODIFF} = \frac{\beta_{TCC-L-Thrust-max} + \beta_{TCC-R-Thrust-max}}{2};$$

computing a maximum mean pitch relating to the maximum usable thrust for the two propellers using the following relationship:

$$\beta_{TCC\text{-}Thrust\text{-}max} = \beta_{TCC\text{-}Thrust\text{-}max\text{-}NODIFF} - ABS$$
$$(\beta_{TCC\text{-}L\text{-}Thrust\text{-}max} - \beta_{TCC\text{-}R\text{-}Thrust\text{-}max});$$

where ABS is the function extracting the absolute value;
computing a first maximum computation pitch relating to the maximum allowable torque for the first propeller using the following relationship:

$$\beta_{TCC-L-Torque-max} = \frac{\beta_{L-Torque-max} + \beta_R}{2},$$

where $\beta_{L\text{-}Torque\text{-}max}$ is the maximum pitch of said first blades relating to the maximum allowable torque for the first propeller;
computing a second maximum computation pitch relating to the maximum allowable torque for the second propeller using the following relationship:

$$\beta_{TCC-R-Torque-max} = \frac{\beta_L + \beta_{R-Torque-max}}{2},$$

where $\beta_{R\text{-}Torque\text{-}max}$ is the maximum pitch of the second blades relating to said maximum allowable torque for the second propeller;
computing a maximum computation mean pitch relating to the maximum allowable torque for the two propellers using the following relationship:

$$\beta_{TCC-Torque-max-NODIFF} = \frac{\beta_{TCC-L-Torque-max} + \beta_{TCC-R-Torque-max}}{2};$$

computing a maximum mean pitch relating to the maximum allowable torque for the two propellers using the following relationship:

$$\beta_{TCC\text{-}Torque\text{-}max} = \beta_{TCC\text{-}Torque\text{-}max\text{-}NODIFF} - ABS$$
$$(\beta_{TCC\text{-}L\text{-}Torque\text{-}max} - \beta_{TCC\text{-}R\text{-}Torque\text{-}max});$$

computing the maximum overall mean pitch relating to the maximum usable thrust and to the maximum allowable torque for the two propellers using the following relationship:

$$\beta_{TCC\text{-}Complete\text{-}max} = \text{MIN}(\beta_{TCC\text{-}Thrust\text{-}max}; \beta_{TCC\text{-}Torque\text{-}max})$$

where MIN is the function extracting the minimum value from the two arguments provided as input.

The step of computing a minimum overall mean pitch $\beta_{TCC\text{-}Complete\text{-}min}$ includes the following substeps:
measuring the first current pitch $\beta_L$ of the first blades of the first propeller, and the second current pitch $\beta_R$ of the second blades of the second propeller, which pitches are measured, for example, by sensors positioned on the flight controls of the hybrid helicopter or indeed on the control shafts for controlling the pitch of said blades;
computing a first minimum computation pitch relating to the minimum usable thrust for each propeller using the following relationship:

$$\beta_{TCC-L-Thrust-min} = \frac{\beta_{L-Thrust-min} + \beta_R}{2},$$

where $\beta_{L\text{-}Thrust\text{-}min}$ is the minimum pitch of the first blades relating to the minimum usable thrust for the first propeller;
computing a second minimum computation pitch relating to the minimum usable thrust for the second propeller using the following relationship:

$$\beta_{TCC-R-Thrust-min} = \frac{\beta_L + \beta_{R-Thrust-min}}{2},$$

where $\beta_{R\text{-}Thrust\text{-}min}$ is the minimum pitch of the second blades relating to the minimum usable thrust for the second propeller;
computing a minimum computation mean pitch relating to the minimum usable thrust for the two propellers using the following relationship:

$$\beta_{TCC-Thrust-min-NODIFF} = \frac{\beta_{TCC-L-Thrust-min} + \beta_{TCC-R-Thrust-min}}{2};$$

computing a minimum mean pitch relating to the minimum usable thrust for the two propellers using the following relationship:

$$\beta_{TCC\text{-}Thrust\text{-}min} = \beta_{TCC\text{-}Thrust\text{-}min\text{-}NODIFF} + ABS$$
$$(\beta_{TCC\text{-}L\text{-}Thrust\text{-}min} - \beta_{TCC\text{-}R\text{-}Thrust\text{-}min});$$

computing a first minimum computation pitch relating to the minimum allowable torque for the first propeller using the following relationship:

$$\beta_{TCC-L-Torque-min} = \frac{\beta_{L-Torque-min} + \beta_R}{2},$$

where $\beta_{L\text{-}Torque\text{-}min}$ is the minimum pitch of the first blades relating to the minimum allowable torque for the first propeller;
computing a second minimum computation pitch relating to the minimum allowable torque for the second propeller using the following relationship:

$$\beta_{TCC-R-Torque-min} = \frac{\beta_L + \beta_{R-Torque-min}}{2},$$

where $\beta_{R\text{-}Torque\text{-}min}$ is the minimum pitch of the second blades relating to the minimum allowable torque for the second propeller;
computing a minimum computation mean pitch relating to the minimum allowable torque for the two propellers using the following relationship:

$$\beta_{TCC-Torque-min-NODIFF} = \frac{\beta_{TCC-L-Torque-min} + \beta_{TCC-R-Torque-min}}{2};$$

computing a minimum mean pitch relating to the minimum allowable torque for the two propellers using the following relationship:

$$\beta_{TCC\text{-}Torque\text{-}min} = \beta_{TCC\text{-}Torque\text{-}min\text{-}NODIFF} + ABS$$
$$(\beta_{TCC\text{-}L\text{-}Torque\text{-}min} - \beta_{TCC\text{-}R\text{-}Torque\text{-}min});$$

computing the minimum overall mean pitch relating to the minimum usable thrust and to the minimum allowable torque for the two propellers using the following relationship:

$$\beta_{TCC-Complete-min} = \text{MAX}(\beta_{TCC-Thrust-min}; \beta_{TCC-Torque-min})$$

where MAX is the function extracting the maximum value from the two arguments provided as input.

In one aspect, the steps of computing the maximum overall mean pitch $\beta_{TCC-Complete-max}$ and the minimum overall mean pitch $\beta_{TCC-Complete-min}$ may include a step of correcting the maximum pitch and the minimum pitch relating to the usable thrust, and of correcting the maximum pitch and the minimum pitch relating to the allowable torque, for a rate of yaw of the hybrid helicopter, for each of the first and second propellers, such that:

the first and second maximum pitches relating to the maximum usable thrust are replaced for each of the two propellers respectively by $$\beta_{L-Thrust-max} + \frac{r \cdot Y_p \cdot \pi}{180 \cdot k \cdot \Omega \cdot R} \text{ and } \beta_{R-Thrust-max} - \frac{r \cdot Y_p \cdot \pi}{180 \cdot k \cdot \Omega \cdot R};$$

the first and second maximum pitches relating to the maximum allowable torque are replaced for each of the two propellers respectively by $$\beta_{L-Torque-max} + \frac{r \cdot Y_p \cdot \pi}{180 \cdot k \cdot \Omega \cdot R} \text{ and } \beta_{R-Torque-max} - \frac{r \cdot Y_p \cdot \pi}{180 \cdot k \cdot \Omega \cdot R}$$

the first and second minimum pitches relating to the minimum usable thrust are replaced for each of the two propellers respectively by $$\beta_{L-Thrust-min} + \frac{r \cdot Y_p \cdot \pi}{180 \cdot k \cdot \Omega \cdot R} \text{ and } \beta_{R-Thrust-min} - \frac{r \cdot Y_p \cdot \pi}{180 \cdot k \cdot \Omega \cdot R};$$

and
the first and second minimum pitches relating to the minimum allowable torque are replaced for each of the two propellers respectively by $$\beta_{L-Torque-min} + \frac{r \cdot Y_p \cdot \pi}{180 \cdot k \cdot \Omega \cdot R} \text{ and } \beta_{R-Torque-min} - \frac{r \cdot Y_p \cdot \pi}{180 \cdot k \cdot \Omega \cdot R},$$

where:
r is the yaw rotation rate of the hybrid helicopter, expressed in degrees per second (°/s);
Yp is the yaw lever arm of the propellers, expressed in meters (m);
π is a trigonometric constant;
Ω is the speed of rotation of the propellers, expressed in radians per second (rad/s);
R is the radius of the propellers, expressed in meters (m); and
k is a positive coefficient less than or equal to 1.

The rate of yaw relates to the yaw rotation rate of the hybrid helicopter, i.e. the speed or velocity of rotation about the yaw axis of the hybrid helicopter. A variation in this yaw rotation rate of the hybrid helicopter has the effect of modifying the angle of incidence seen by the blades of the propellers and, as a result, of modifying the thrust and the torque for said propellers. Introducing the rate of yaw advantageously makes it possible to take into account this modification in the thrust and in the torque for the propellers and to optimize the positions of the upper and lower limits accordingly.

The coefficient k relates to the pitch reference of the blades of a rotor or of a propeller along the span of the blade. For example, the coefficient k is equal to 0.75 when the pitch of a blade is considered three-quarters of the way along the span of the blade from the center of the rotor.

In addition to providing a method, the invention also provides a hybrid helicopter provided with a lift rotor that is, for example, arranged above the fuselage, and with at least one propeller, the hybrid helicopter including a control system connected to the blades of said at least one propeller, the hybrid helicopter having a thrust control configured to generate an order for modifying a pitch of the blades, which order is transmitted to the control system. The control system is configured to apply the above-described method of the invention.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Figure 1:
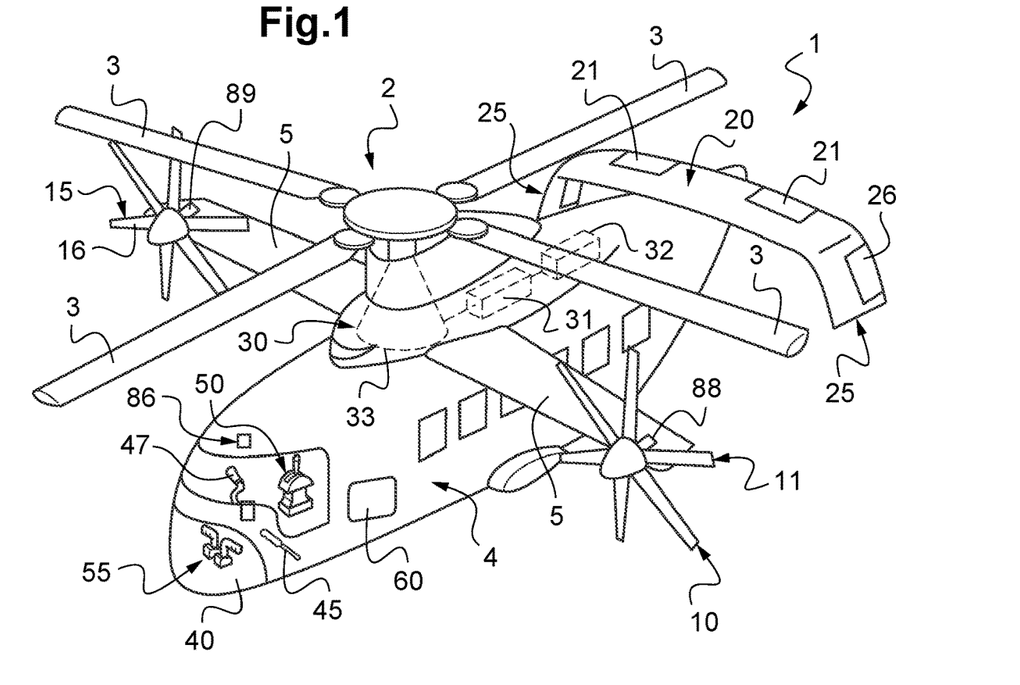
FIG. 1 is a diagrammatic view of a hybrid helicopter of the invention.

FIG. 1 shows a hybrid helicopter 1 of the invention. This hybrid helicopter 1 has a fuselage 4 above which at least one lift rotor 2 is arranged. The lift rotor 2 is provided with a plurality of blades referred to for convenience as "main blades 3".

In addition, the hybrid helicopter 1 is provided with at least one propeller 10, 15 of the puller type or of the pusher type, having a plurality of blades 11, 16. In FIG. 1, the hybrid helicopter 1 has a first propeller 10 and a second propeller 15 that are disposed laterally relative to the fuselage 4, and in particular on either side of an anteroposterior plane of the hybrid helicopter 1. The sides on which the first and second propellers 10, 15 are arranged may be reversed. The first and second propellers 10, 15 respectively have a plurality of first blades 11 and a plurality of second blades 16. The first and second propellers 10, 15 are optionally carried by a support 5. Such a support 5 may optionally be aerodynamic. For example, the support 5 comprises a wing as shown in FIG. 1. In FIG. 1, the propellers 10, 15 are placed at the leading edge of a wing. In another example, the propellers 10, 15 may be placed at the trailing edge of the wing.

Furthermore, the hybrid helicopter 1 may include surfaces for stabilizing or indeed maneuvering purposes, i.e. stabilizer surfaces and movable control surfaces. For example, for longitudinal (pitch) stability and control, the hybrid helicopter 1 may include at least one substantially horizontal stabilizer 20, optionally provided with movable pitch control surfaces or "elevators" 21. For example, for directional (yaw) stability and control, the hybrid helicopter 1 may include at least one substantially vertical stabilizer 25, optionally provided with movable fins or "rudders" 26. FIG. 1 thus shows a tail assembly that is in the shape of an upside-down U, but the tail assembly may have various shapes without going beyond the ambit of the invention. In another example, the tail assembly may be H-shaped, U-shaped, etc.

Furthermore, the hybrid helicopter 1 includes a power plant 30 for delivering power to the lift rotor 2 and optionally to each propeller 10, 15. For this purpose, the power plant 30 includes at least one engine 31 that is controlled by a usual engine computer 32.

The term "computer" is used below to mean a unit that may, for example, comprise at least one processor and at least one memory, at least one integrated circuit, at least one programmable system, and at least one logic circuit, these examples not limiting the scope given to the expression "computer". The term. "processor" may be used equally well to mean a central processing unit (CPU), a graphics processing unit (GPU), a digital signal processor (DSP), a microcontroller, etc.

In addition, for example inside an interconnection system, the power plant 30 may further include at least one gearbox, at least one shaft, and/or at least one member for interconnecting two members in rotation, etc. For example, one or more engines 31 are connected mechanically via one or more mechanical connection systems to a main gearbox 33 that drives the lift rotor 2 in rotation. Furthermore, the main gearbox 33 may be connected mechanically via respective shafts to auxiliary gearboxes, one for each of the propellers 10, 15, which auxiliary gearboxes are then in turn connected to the corresponding propellers 10, 15.

The engines 31, the main gearbox 33, each auxiliary gearbox, and the connecting shafts between those elements and each transmission shaft driving the blades 11, 16 of the propellers 10, 15 in rotation form a mechanical power transmission system for the hybrid helicopter 1 that drives the blades 11, 16 of the propellers 10, 15 in rotation.

The speeds of rotation of the outlets of the engine(s) 31, of the propellers 10, 15, of the lift rotor 2, and of the mechanical interconnection system are optionally mutually proportional, with the proportionality ratio optionally being constant regardless of the flight configuration of the hybrid helicopter 1 under normal operating conditions, i.e. except for failure, testing or training situations.

Furthermore, the hybrid helicopter 1 may include various controls for being piloted.

In particular, the hybrid helicopter 1 may include a control system 40 connected to flight controls 45, 47 for collectively and cyclically controlling the pitch of the main blades 3. Such a control system 40 may, for example, include a set of swashplates. Thus, at each instant, the pitch of the main blades 3 may be equal to the sum of a collective pitch that is identical for all of the main blades 3 and of a cyclic pitch that varies as a function of the azimuth position of each main blade 3.

In usual manner, the hybrid helicopter 1 may include controls connected to the control system 40 for controlling the pitch of the first blades 11 of the first propeller 10 and the second blades 16 of the second propeller 15. At each instant, the first pitch of the first blades 11 of the first propeller 10 may be equal to the sum of a mean pitch component and of a differential pitch component, while the second pitch of the second blades 16 of the second propeller 15 is equal to the difference between the mean pitch component and the differential pitch component.

Optionally, the hybrid helicopter 1 has a first measurement sensor 88 for measuring the first value of the first pitch of the first blades 11 and a second measurement sensor 89 for measuring the second value of the second pitch of the second blades 16. For example, the first measurement sensor 88 includes a position sensor that emits an analog or digital, electrical or optical signal that varies as a function of the position of a control shaft for controlling the first pitch of the first blades 11. Similarly, the second sensor 89 may include a position sensor that emits an analog or digital, electrical or optical signal that varies as a function of the position of a control shaft for controlling the second pitch of the second blades 16. Each position sensor may be of a usual type and, for example, comprise a speed sensor making it possible to obtain a position by integration, a potentiometer, etc.

The hybrid helicopter 1 may also include at least one torque sensor 87 making it possible to measure a torque exerted in the mechanical transmission system and driving the blades 11, 16 of each propeller 10, 15 in rotation. Such a torque sensor 87 may be positioned at any point along the mechanical transmission system and is sufficient to determine the torque at any point of said transmission system. For example, two torque sensors 87 are positioned on respective ones of the transmission shafts of the two propellers 10, 15.

Furthermore, the hybrid helicopter 1 may include a measurement device 86 for measuring the current forward speed relative to air or current "airspeed" of the hybrid helicopter 1. For example, the measurement device 89 includes an anemometer, a device provided with a Pitot tube, or any other suitable device. The forward speed may be the "True Air Speed" (TAS) or the "Indicated Air Speed" (IAS).

In usual manner, the hybrid helicopter 1 may include a thrust control 50 that is operable by a pilot and that acts on one or more mechanical and/or electrical control channels of the control system 40 to cause the mean pitch component of the pitch of the first blades 11 and of the pitch of the second blades 16 to vary. FIG. 1 shows a thrust control 50 of the lever type, but the thrust control may also, for example, take the form of a button generating a digital signal, or of a knurled wheel generating an analog signal.

Similarly, the hybrid helicopter 1 may include a yaw control 55 that is operable by a pilot and that acts on one or more mechanical and/or electrical control channels of the control system 40 to cause the differential pitch component of the pitch of the first blades 11 and of the pitch of the second blades 16 to vary. The yaw control 55 may, for example, take the form of pedals, for example.

Furthermore, the control system. 40 may include a control computer 60 that is in communication at least with the thrust control 50 so as to apply the method of the invention and optionally also with the yaw control 55, with the first measurement sensor 88 and/or with the second measurement sensor 89.

Figure 2:
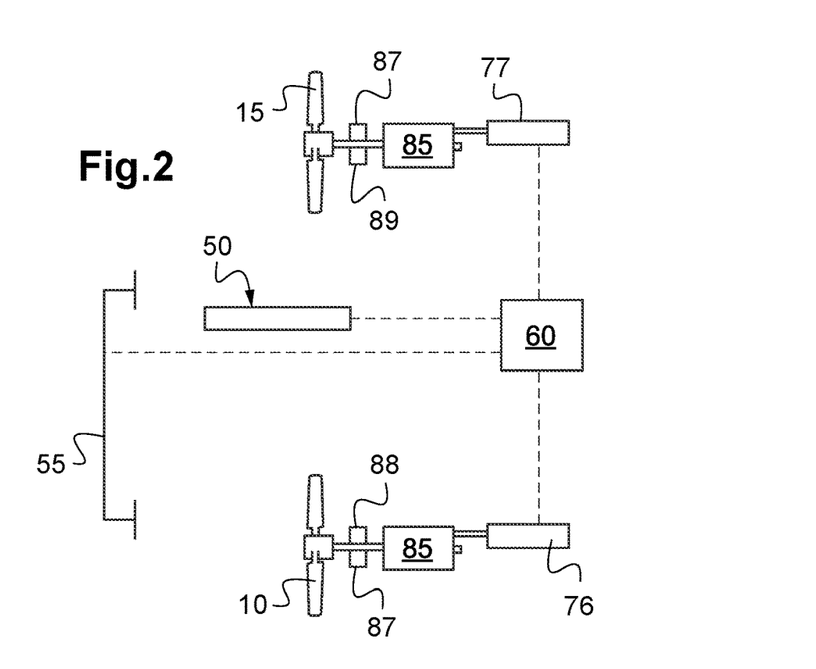
FIG. 2 is a diagrammatic view of a control system for controlling the propellers of a hybrid helicopter of the invention.

FIG. 2 shows an example of a control system 40 for controlling the propellers 10, 15.

In this example, the yaw control 55 and the thrust control 50 communicate with the control computer 60. The control computer 60 is in communication with actuators 76, 77 that are connected to respective hydraulic valves 85.

The control computer 60 then applies one or more laws stored in a memory so as to control the actuators 76, 77 as a function of the signals issued directly or indirectly by the thrust control 50 and optionally by the yaw control 55.

The control system 40 of FIG. 2 is given by way of illustration.

Figure 3:
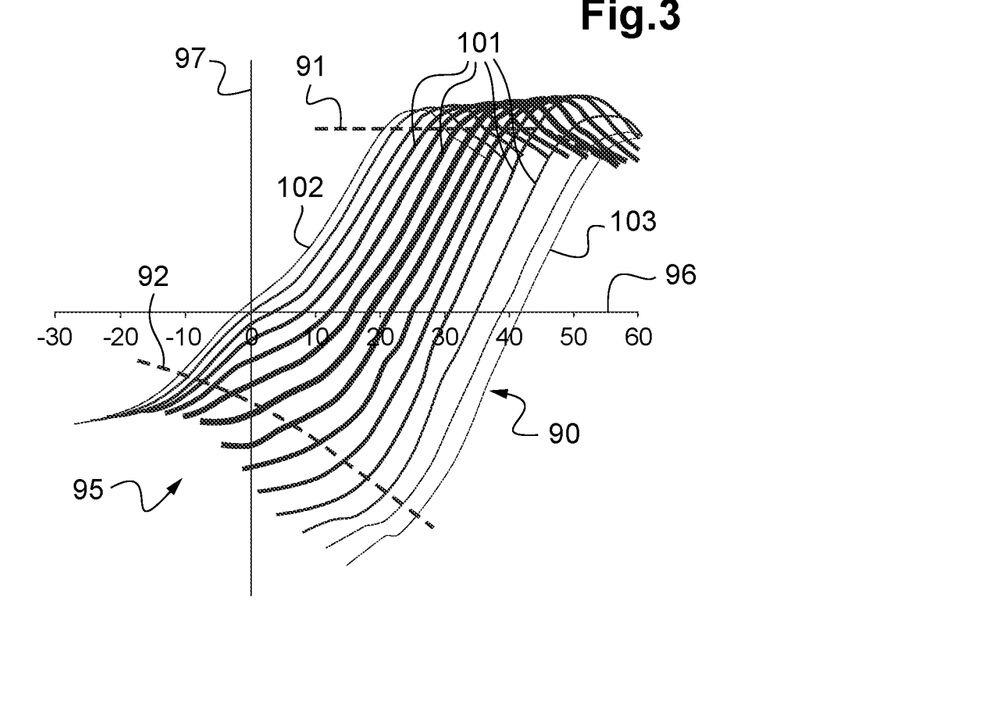
FIG. 3 is a thrust control diagram showing the method of the invention.
Figure 4:
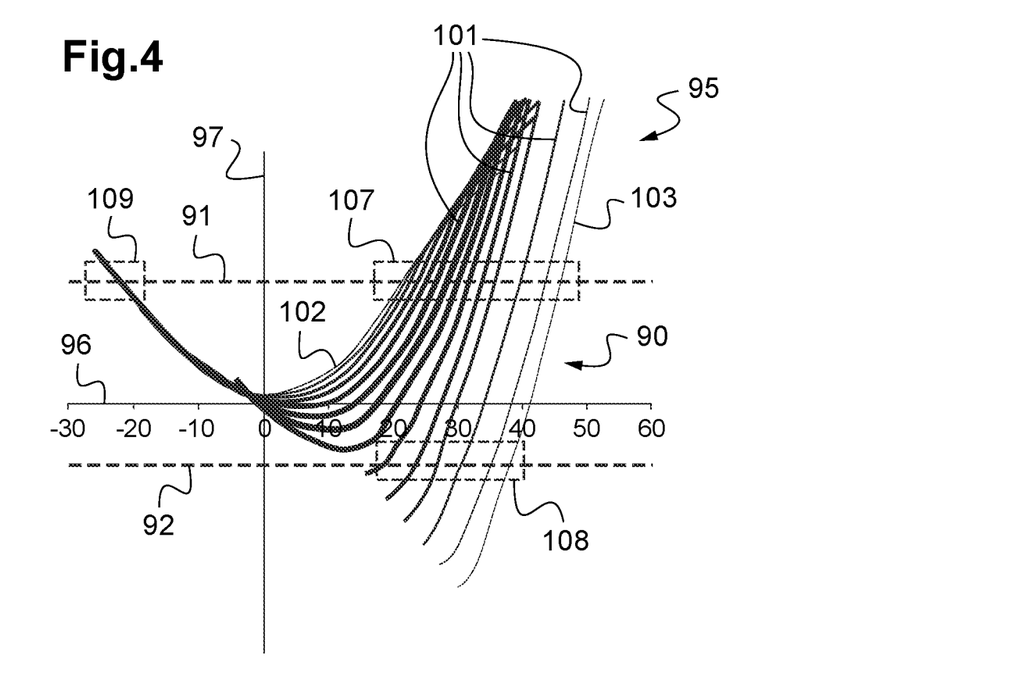
FIG. 4 is a torque control diagram showing the method of the invention.

In another aspect, FIGS. 3 and 4 show control diagrams 95 relating to respective ones of two different characteristics of a propeller 10, 15, and plotting the pitch of the blades 11, 16 of said propeller 10, 15 along the abscissa axis 96 and said characteristic of the propeller 10, 15 up the ordinate axis 97. Each control diagram 95 includes a set of curves 101, 102, 103 showing how the characteristic varies as a function of the pitch of the blades 11, 16 of the propeller 10, 15. Each curve 101, 102, 103 is defined for a respective forward speed of the hybrid helicopter 1. For both FIGS. 3 and 4, the left-most curve 102 corresponds to a substantially zero forward speed, and the right-most curve 103 corresponds to a maximum forward speed of the hybrid helicopter 1.

Each control diagram 95 has an upper limit 91 and a lower limit 92 that delimit a control envelope 90.

FIG. 3 shows a control diagram 95 relating to the thrust generated by the propeller 10, 15. The upper limit 91 and the lower limit 92 are associated with the aerodynamic limits of the propeller 10, 15, and in particular with aerodynamic stalling of the blades 11, 16 of the propeller 10, 15. The upper limit 91 and the lower limit 92 are thus defined by pitch values at which stalling occurs as a function of the forward speed of the hybrid helicopter 1, optionally while taking a margin into account.

Furthermore, the thrust taken into account in the control diagram 90 may be the thrust generated by a propeller 10, 15 per se or else a reduced thrust that can be independent of the atmospheric conditions, and in particular of the temperature and of the current atmospheric pressure outside the hybrid helicopter 1.

FIG. 4 shows a control diagram 95 relating to a torque exerted in the mechanical transmission system of the hybrid helicopter 1. The upper limit 91 and the lower limit 92 are associated with mechanical limits relating to the mechanical transmission system that drives the blades 11, 16 of each propeller 10, 15.

The upper limit 91 corresponds to the situation in which the propeller 10, 15 is in drive mode and is therefore participating in propelling the hybrid helicopter 1. This upper limit 91 may be reached when the propeller 10, 15 generates a thrust towards the front of the hybrid helicopter 1, the pitch of the blades 11, 16 then being positive and situated in the region 107 in FIG. 4. This upper limit 91 may also be reached when the propeller 10, 15 generates a thrust towards the rear of the hybrid helicopter 1, the pitch of the blades 11, 16 then being negative and situated in the region 109 in FIG. 4. This particular situation actually occurs during hovering or when flying at a very low forward speed, the yaw control function of the propellers 10, 15 predominating over the forward propulsion function so as to oppose the torque generated by the lift rotor 2 on the fuselage 4.

The lower limit 92 corresponds to the situation in which the propeller 10, 15 is generating mechanical power and is thus not participating in the forward propulsion of the hybrid helicopter 1. This lower limit 92 may be reached transiently following a rapid reduction in the pitch of the blades 11, 16 of the propellers 10, 15 in cruising flight at high forward speeds or indeed in the situation of diving or nose-down flight. In both of these situations, the airflow sweeping over the hybrid helicopter 1 causes the blades 11, 16 of the propellers 10, 15 to rotate. The pitch of the blades 11, 16 remains positive and is situated in the region 108 shown in FIG. 4.

In the method of the invention, at each iteration, the control system 40 keeps the pitch of the blades 11, 16 of each propeller 10, 15 within the respective control envelope 90 for a characteristic of the propeller 10, 15, namely the thrust generated by the propeller 10, 15 and/or the torque exerted in the mechanical transmission system. In this way, at each iteration, the control system 40 bounds the pitches of the blades 11, 16 by keeping them within the authorized control envelopes 90 so as to protect automatically the mechanical transmission system driving the blades 11, 16 of the propellers 10, 15 and/or to protect automatically the advancing of the hybrid helicopter.

Each control envelope 90 is bounded by an upper limit 91 and a lower limit 92 that are specific to the associated characteristic. The above-mentioned keeping step makes it possible, at each iteration and as a function of the forward speed, firstly to keep the pitch of the blades 11, 16 of the propeller 10, 15 below the upper limit 91 and secondly to keep the pitch of the blades 11, 16 of the propeller 10, 16 above the lower limit 92.

In this way, when the pitch of the blades 11, 16 of a propeller 10, 16 reach the upper limit 91, the control system acts, e.g. when the forward speed decreases, to cause a reduction in the pitch of the blades 11, 16 of said propeller 10, 15 in absolute value, or else, when the forward speed does not increase, to prevent an increase in the pitch of the blades 11, 16 of said propeller 10, 15 in absolute value.

When the characteristic of the propeller 10, 15 is the torque exerted in the mechanical transmission system, the use of absolute values makes it possible to take into account the situations of positive pitch and of negative pitch.

Similarly, when the pitch of the blades 11, 16 of a propeller 10, 15 reaches the lower limit 92, the control system acts, e.g. when the forward speed increases, to cause an increase in the pitch of the blades 11, 16 of said propeller 10, 15, or else, when the forward speed does not decrease, to prevent a reduction in the pitch of the blades 11, 16 of said propeller 10, 15.

The position of the current operating point of the hybrid helicopter 1 on the control diagram 90 may be determined via the pitch of the blades 11, 16 of the propeller 10, 15, which pitch is obtained by means of a sensor 88, 89, and via the current forward speed of the hybrid helicopter 1, which speed is obtained by means of the measurement device 86.

When the characteristic of the propeller 10, 15 is the torque exerted in the mechanical transmission system, the position of said current operating point on the control diagram 90 may be determined via the torque exerted in the mechanical transmission system, which torque is obtained by means of a torque sensor 87, and via the current forward speed of the hybrid helicopter 1, which speed is obtained by means of the measurement device 86.

Therefore, when a pilot of the hybrid helicopter 1 acts on the thrust control 50, the control computer 60 receives a thrust control signal directly or indirectly from the thrust control 50 and can then control the actuators 76, 77 as a function at least of a law stored in a memory and making it possible to bound the orders issued via the thrust control signal in order to keep the pitch of the blades 11, 16 of each propeller 10, 15 within the control envelope 90.

Furthermore, during the step of keeping the pitch within the control envelope 90, the control computer 60 makes it possible to compute a maximum pitch and a minimum pitch corresponding respectively to the upper limit 91 and to the lower limit 92 of the control envelope 90 for each propeller and for each characteristic of the propeller 10, 15. For example, the maximum pitch is defined on the control diagram 90 by the intersection where the upper limit 92 intersects a curve 102 corresponding to the current forward speed of the hybrid helicopter 1 and the minimum pitch is defined by the intersection where the lower limit 91 intersects the same curve.

When the characteristic of the propeller 10, 15 is the torque exerted in the mechanical transmission system, during the step of keeping the pitch within the control envelope 90, the control computer 60 makes it possible, at each iteration and for the current forward speed of the hybrid helicopter 1, to compute a maximum pitch $\beta_{Torque-max}$ and a minimum pitch $\beta_{Torque-min}$ for the blades 11, 16 of the propeller 10, 15 relative respectively to a maximum torque and to a minimum torque allowable by the mechanical transmission system. The minimum allowable torque is actually a negative torque.

Similarly, when the characteristic of the propeller 10, 15 is the thrust from said propeller 10, 15, during the step of keeping the pitch within the control envelope 90, the control computer 60 makes it possible, at each iteration and for the current forward speed of the hybrid helicopter 1, to compute a maximum pitch $\beta_{Thrust-max}$ and a minimum pitch $\beta_{Thrust-min}$ for the blades 11, 16 of the propeller 10, 15 relative respectively to a maximum usable thrust and to a minimum usable thrust.

The maximum pitches $\beta_{Thrust-max}$ and $\beta_{Torque-max}$ for the blades 11, 16 may be different for the two propellers, e.g. when the geometrical shapes of the blades 11, 16 of the two propellers 10, 15 are different. The same applies for the minimum pitches $\beta_{Thrust-min}$ and $\beta_{Torque-min}$. "$\beta_{L-Thrust-max}$" and "$\beta_{L-Torque-max}$" then identify the maximum pitches for the blades 11 of the first propeller 10, and "$\beta_{R-Thrust-max}$" and "$\beta_{R-Torque-max}$" then identify the maximum pitches for the blades 16 of the second propeller 15 relative respectively to the usable thrust and to the torque allowable by the mechanical transmission system.

The control computer 60 may then control the actuators 76 and 77 as a function at least of a law stored in a memory and of the maximum and minimum pitches relating respectively to maximum and minimum characteristics, after the control computer 60 has received a thrust control signal subsequently to a pilot acting on said thrust control 50. This at least one law makes it possible to bound the orders issued via the thrust control signal in order to keep the pitches of the blades 11, 16 of each propeller 10, 15 within the control envelope 90.

The method of the invention for providing torque protection and thrust protection for at least one propeller 10, 15 of a hybrid helicopter 1 can thus make it possible to provide the (or each) propeller 10, 15 with protection independently for each of its characteristics, namely for its thrust and for the torque exerted in the mechanical transmission system. When the hybrid helicopter 1 includes two or more propellers 10, 15, the method of the invention can thus make it possible to protect each propeller 10, 15 independently from the other(s).

However, it may be advantageous to combine the maximum pitches of a propeller 10, 15 relating to the two characteristics of said propeller 10, 15, namely its thrust and the torque exerted in its mechanical transmission system in order to take into account simultaneously the limits associated with said two characteristics.

Similarly, it may be advantageous to combine the maximum pitches of all of the propellers 10, 15 of the hybrid helicopter 1, when the hybrid helicopter includes two or more propellers 10, 15, in order to take into account simultaneously for each propeller 10, 15 the limits associated with all of the propellers 10, 15.

For this purpose, the method of the invention can make it possible, for the current forward speed of the hybrid helicopter, firstly to compute a maximum overall mean pitch $\beta_{TCC-Complete-max}$ relating simultaneously to the maximum usable thrust and to the maximum allowable torque for each propeller 10, 15, and to compute a minimum overall mean pitch $\beta_{TCC-Complete-min}$ relating simultaneously to the minimum usable thrust and to the minimum allowable torque for each propeller, for the current forward speed of the hybrid helicopter.

The minimum overall mean pitch $\beta_{TCC-Complete-min}$ of a propeller 10, 15 may be defined as a function of the minimum pitch $\beta_{Thrust-min}$ and of the minimum pitch $\beta_{Torque-min}$ for said propeller 10, 15, and optionally of the minimum pitches for each other propeller 10, 15 of the hybrid helicopter 1.

Similarly, the maximum overall mean pitch $\beta_{TCC-Complete-max}$ may be defined as a function of the maximum pitch $\beta_{Thrust-max}$ and of the maximum pitch $\beta_{Torque-max}$ for said propeller 10, 15, and optionally of the maximum pitches for each other propeller 10, 15 of the hybrid helicopter 1.

The control computer 60 may then control the actuators 76, 77 as a function at least of a law stored in a memory, of the minimum overall mean pitch $\beta_{TCC-Complete-min}$, and of the maximum overall mean pitch $\beta_{TCC-Complete-max}$ after the control computer 60 has received a thrust control signal. This at least one law makes it possible to bound the orders issued via the thrust control signal in order to keep the pitches of the blades 11, 16 of each propeller 10, 15 within the control envelope 90.

For a hybrid helicopter 1 including two propellers 10, 15 as shown in FIG. 1, the step of computing a maximum overall mean pitch $\beta_{TCC-Complete-max}$ may comprise the following steps:

measuring a first current pitch $\beta_L$ of the first blades 11 and a second current pitch $\beta_R$ of the second blades 16;

computing a first maximum computation pitch relating to the maximum usable thrust for the first propeller 10 such that:

$$\beta_{TCC-L-Thrust-max} = \frac{\beta_{L-Thrust-max} + \beta_R}{2};$$

computing a second maximum computation pitch relating to the maximum usable thrust for the second propeller 15 such that:

$$\beta_{TCC-R-Thrust-max} = \frac{\beta_L + \beta_{R-Thrust-max}}{2};$$

computing a maximum computation mean pitch relating to the maximum usable thrust for the two propellers 10,15 such that:

$$\beta_{TCC-Thrust-max-NODIFF} = \frac{\beta_{TCC-L-Thrust-max} + \beta_{TCC-R-Thrust-max}}{2};$$

computing a maximum mean pitch relating to the maximum usable thrust for the two propellers 10,15 such that:

$$\beta_{TCC-Thrust-max} = \beta_{TCC-Thrust-max-NODIFF} - ABS$$
$$(\beta_{TCC-L-Thrust-max} - \beta_{TCC-R-Thrust-max});$$

computing a maximum computation pitch relating to the maximum allowable torque for the first propeller 10 such that:

$$\beta_{TCC-L-Torque-max} = \frac{\beta_{L-Torque-max} + \beta_R}{2};$$

computing a second maximum computation pitch relating to the maximum allowable torque for the second propeller 15 such that:

$$\beta_{TCC-R-Torque-max} = \frac{\beta_L + \beta_{R-Torque-max}}{2};$$

computing a maximum computation mean pitch relating to the maximum allowable torque for the two propellers 10,15 such that:

$$\beta_{TCC-Torque-max-NODIFF} = \frac{\beta_{TCC-L-Torque-max} + \beta_{TCC-R-torque-max}}{2};$$

computing a maximum mean pitch relating to the maximum allowable torque for the two propellers 10,15 such that:

$\beta_{TCC-Torque-max} = \beta_{TCC-Torque-max-NODIFF} - ABS$
$(\beta_{TCC-L-Torque-max} - \beta_{TCC-R-Torque-max})$; and computing a maximum overall mean pitch relating to the maximum usable thrust and to the maximum allowable torque for the two propellers 10,15 such that:

$\beta_{TCC-Complete-max} = MIN(\beta_{TCC-Thrust-max};$
$\beta_{TCC-Torque-max}).$ Furthermore, during a correction step, for each of the two propellers 10,15, the maximum pitches $\beta_{L-Thrust-max}$, $\beta_{R-Thrust-max}$, $\beta_{L-Torque-max}$ and $\beta_{R-Torque-max}$ may be corrected for a rate of yaw of the hybrid helicopter 1 and be replaced respectively by $$\beta_{L-Thrust-max} + \frac{r.Y_p.\pi}{180.k\Omega R}, \beta_{R-Thrust-max} - \frac{r.Y_p.\pi}{180.k\Omega R},$$

$$\beta_{L-Torque-max} + \frac{r.Y_p.\pi}{180.k\Omega R} \text{ and } \beta_{R-Torque-max} - \frac{r.Y_p.\pi}{180.k\Omega R},$$

where:
r is the yaw rotation rate of the hybrid helicopter 1, expressed in degrees per second (°/s);
Yp is the yaw lever arm of the propellers 10, 15, expressed in meters (m);
π is a trigonometric constant;
Ω is the speed of rotation of the propellers 10, 15, expressed in radians per second (rad/s),
R is the radius of the propellers 10, 15, expressed in meters (m); and
k is a positive coefficient less than or equal to 1.

The step of computing a minimum overall mean pitch $\beta_{TCC-Complete-min}$ may also include the following substeps:
measuring a first current pitch $\beta_L$ of the first blades 11 and a second current pitch $\beta_R$ of the second blades 16;
computing a first minimum computation pitch relating to the minimum usable thrust for the first propeller 10 such that, $$\beta_{TCC-L-Thrust-min} = \frac{\beta_{L-Thrust-min} + \beta_R}{2};$$

computing a second minimum computation pitch relating to the minimum usable thrust for the second propeller 15 such that, $$\beta_{TCC-R-Thrust-min} = \frac{\beta_L + \beta_{R-Thrust-min}}{2};$$

computing a minimum computation mean pitch relating to the minimum usable thrust for the two propellers 10,15 such that:

$$\beta_{TCC-Thrust-min-NODIFF} = \frac{\beta_{TCC-L-Thrust-min} + \beta_{TCC-R-Thrust-min}}{2};$$

computing a minimum computation mean pitch relating to the minimum usable thrust for the two propellers 10,15 such that:

$\beta_{TCC-Thrust-min} = \beta_{TCC-Thrust-min-NODIFF} + ABS$
$(\beta_{TCC-L-Thrust-min} - \beta_{TCC-R-Thrust-min});$ computing a first minimum computation pitch relating to the minimum allowable torque for the first propeller 10 such that:

$$\beta_{TCC-L-Torque-min} = \frac{\beta_{L-Torque-min} + \beta_R}{2};$$

computing a second minimum computation pitch relating to the minimum allowable torque for the second propeller 15 such that:

$$\beta_{TCC-R-Torque-min} = \frac{\beta_L + \beta_{R-Torque-min}}{2};$$

computing a minimum computation mean pitch relating to the minimum allowable torque for the two propellers 10,15 such that:

$$\beta_{TCC-Torque-min-NODIFF} = \frac{\beta_{TCC-L-Torque-min} + \beta_{TCC-R-torque-min}}{2};$$

computing a minimum mean pitch relating to the minimum allowable torque for the two propellers 10,15 such that:

$\beta_{TCC-Torque-min} = \beta_{TCC-Torque-min-NODIFF} + ABS$
$(\beta_{TCC-L-Torque-min} - \beta_{TCC-R-Torque-min});$ and computing a minimum overall mean pitch relating to the minimum usable thrust and to the minimum allowable torque for the two propellers 10,15 such that:

$\beta_{TCC-Complete-min} = MAX(\beta_{TCC-Thrust-min};$
$\beta_{TCC-Torque-min}).$ As above, during the correction step, for each of the two propellers 10,15, the minimum pitches $\beta_{L-Thrust-min}$, $\beta_R$-Thrust-min, $\beta_{L-Torque-min}$ and $\beta_{R-Torque-min}$ may be corrected for the rate of yaw of the hybrid helicopter 1 and be replaced respectively by $$\beta_{L-Thrust-min} + \frac{r.Y_p.\pi}{180.k\Omega R}, \beta_{R-Thrust-min} - \frac{r.Y_p.\pi}{180.k\Omega R},$$

$$\beta_{L-Torque-min} + \frac{r.Y_p.\pi}{180.k\Omega R} \text{ and } \beta_{R-Torque-min} - \frac{r.Y_p.\pi}{180.k\Omega R}.$$

Furthermore, when the control system 40 receives a yaw control signal directly or indirectly from the yaw control 55 subsequently to an action from the pilot when the pitch of the blades 11, 16 of at least one propeller reaches one of the limits 91, 92 of the control envelope 90, the control system 40 can then control the actuators 76, 77 as a function at least of a law stored in a memory after the control computer 60 has received the yaw control signal. This at least one law then advantageously makes it possible to modify the mean pitch component of the pitch of the blades 11, 16 of the propellers 10, 15 in such a manner as to make it possible to apply the differential pitch component to the pitch of the blades 11, 16 of the two propellers 10, 15 without going outside the control envelope 40.

Indeed, the mean pitch component of the pitch of the blades 11, 16 of the propellers 10, 15 is modified by a value substantially equal to the absolute value of the modification in the differential pitch component corresponding to the yaw control signal. Therefore, once the pitch of the blades 11, 16 of the propeller 10, 15 has reached one of the limits 91, 92, it moves far enough away from said limit 91, 92 to make it possible to perform the yaw control requested by the pilot without going outside the control envelope 90.

The method of the invention is thus not limited to the actions of the pilot on the yaw control 55 acting on the differential pitch. The maneuvers consequent upon an action on the yaw control 55 such as, for example, a change of direction, may be performed while also advantageously keeping the protection afforded by the method of the invention.

Furthermore, when the hybrid helicopter 1 includes a single propeller 10 or a plurality of propellers 10, 15, the maximum overall mean pitch $\beta_{TCC-Complete-max}$ may also be determined such as to be equal to the minimum value of the maximum pitch $\beta_{Thrust-max}$ and of the maximum pitch $\beta_{Torque-max}$ of each propeller 10, 15 while the minimum overall mean pitch $\beta_{TCC-Complete-min}$ may be determined such as to be equal to the maximum value from among the minimum pitch $\beta_{Thrust-min}$ relating to the minimum usable thrust and the minimum pitch $\beta_{Torque-min}$ relating to the minimum allowable torque for each propeller 10, 15.

Naturally, the present invention may be subjected to numerous variations as to its implementation. Although several implementations are described above, it should readily be understood that it is not conceivable to identify exhaustively all possible implementations. It is naturally possible to envisage replacing any of the means described by equivalent means without going beyond the ambit of the present invention.

What is claimed is:

1. A method of providing torque protection and/or thrust protection for at least one propeller of a hybrid helicopter, the hybrid helicopter including a lift rotor and at least one propeller, the hybrid helicopter including a control system connected to blades of the at least one propeller, the hybrid helicopter having a thrust control configured to generate an order for modifying a pitch of the blades, which order is transmitted to the control system, the blades of the at least one propeller being driven in rotation by a mechanical transmission system of the hybrid helicopter; the method including the following step:

having the control system keep the pitch of the blades of the at least one propeller within at least one control envelope relating to a characteristic of the at least one propeller and defined by limits for the characteristic, the characteristic being a thrust generated by the at least one propeller or a torque exerted in the mechanical transmission system;

wherein the at least one control envelope is bounded by an upper limit and by a lower limit for the characteristic in a control diagram plotting the pitch of the blades of a propeller along the abscissa axis and the characteristic of the propeller up the ordinate axis, the control diagram including a set of curves for different forward speeds of the hybrid helicopter, and the step of having the control system keep the pitch within the at least one control envelope includes the following steps at each iteration:

keeping the pitch of the blades below the upper limit as a function of the forward speed of the hybrid helicopter; and keeping the pitch of the blades above the lower limit as a function of the forward speed of the hybrid helicopter.

2. The method according to claim 1, wherein, when the pitch of the blades reaches the upper limit, keeping the pitch below the upper limit includes the following step at each iteration:

reducing the pitch in absolute value when the forward speed of the hybrid helicopter decreases relative to the forward speed reached when the pitch of the blades reaches the upper limit.

3. The method according to claim 1, wherein, when the pitch of the blades reaches the upper limit, keeping the pitch below the upper limit includes the following step at each iteration:

preventing any increase in the pitch in absolute value when the forward speed of the hybrid helicopter does not increase above the forward speed reached when the pitch of the blades reaches the upper limit.

4. The method according to claim 1, wherein, when the pitch of the blades reaches the lower limit, keeping the pitch above the lower limit includes the following step at each iteration:

increasing the pitch when the forward speed of the hybrid helicopter increases relative to the forward speed reached when the pitch of the blades reaches the lower limit.

5. The method according to claim 1, wherein, when the pitch of the blades of a propeller reaches the lower limit, keeping the pitch above the lower limit includes the following step at each iteration:

preventing any reduction in the pitch when the forward speed of the hybrid helicopter does not decrease below the forward speed reached when the pitch of the blades reaches the lower limit.

6. The method according to claim 1, wherein, when the characteristic is the torque exerted in the mechanical transmission system, the step of having the control system keeps the pitch within the at least one control envelope includes the following steps at each iteration:

computing a maximum pitch ($\beta_{Torque-max}$) for the blades relating to a maximum allowable torque for a current forward speed of the hybrid helicopter; and computing a minimum pitch ($\beta_{Torque-min}$) for the blades relating to a minimum allowable torque for the current forward speed of the hybrid helicopter.

7. The method according to claim 6,
wherein, with the control system including a control computer receiving at least one thrust control signal issued by the thrust control, and with the control computer controlling at least one actuator of the control system, keeping the pitch within the at least one control envelope includes a step of having the control computer control the at least one actuator as a function at least of a law stored in a memory as well as at least of the thrust control signal, of the maximum pitch ($\beta_{Torque\text{-}max}$) and of the minimum pitch ($\beta_{Torque\text{-}min}$).

8. The method according to claim 1,
wherein, when the characteristic is the thrust, the step of having the control system keeps the pitch within the at least one control envelope includes the following steps at each iteration:
computing a maximum pitch ($\beta_{Thrust\text{-}max}$) for the blades relating to a maximum usable thrust for a current forward speed of the hybrid helicopter; and
computing a minimum pitch ($\beta_{Thrust\text{-}min}$) for the blades relating to a minimum usable thrust for the current forward speed of the hybrid helicopter.

9. The method according to claim 8,
wherein, with the control system including a control computer receiving at least one thrust control signal issued by the thrust control, and with the control computer controlling at least one actuator of the control system, keeping the pitch within the control envelope includes a step of having the control computer control the at least one actuator as a function at least of a law stored in a memory as well as at least of the thrust control signal, of the maximum pitch ($\beta_{Thrust\text{-}max}$) and of the minimum pitch ($\beta_{Thrust\text{-}min}$).

10. The method according to claim 1,
wherein, with the hybrid helicopter including a first propeller and a second propeller performing a forward propulsion function and a yaw control function for the hybrid helicopter, with the control system being connected to first blades of the first propeller and to second blades of the second propeller, with the thrust control being configured to generate an order for modifying a mean pitch of a first pitch of the first blades and of a second pitch of the second blades, which order is transmitted to the control system, with the hybrid helicopter including a yaw control configured to generate an order for modifying a differential pitch component of the first pitch of the first blades and of the second pitch of the second blades, which order is transmitted to the control system,
with the at least one control envelope being bounded by an upper limit and by a lower limit for the characteristic in a control diagram, with the control system including a control computer receiving at least one thrust control signal issued by the thrust control and at least one yaw control signal issued by the yaw control, with the pitch of the blades of at least one propeller reaching one of the limits of the at least one control envelope, and with the control computer controlling at least one actuator of the control system, keeping the pitch within the control envelope includes a step of having the control computer control the at least one actuator as a function at least of a law stored in a memory as well as at least of the thrust control signal and of the yaw control signal in order to modify the mean pitch of the pitches of the blades of the propellers in such a manner as to cause the pitch of the blades of at least one propeller having reached one of the limits to move away from the limit, and as to enable the differential pitch of the pitches of the blades of the propellers to be modified in compliance with the yaw control signal without going outside the at least one control envelope.

11. A hybrid helicopter provided with a lift rotor and with at least one propeller, the hybrid helicopter including a control system connected to the blades of the at least one propeller, the hybrid helicopter having a thrust control configured to generate an order for modifying a pitch of the blades, which order is transmitted to the control system,
wherein the control system is configured to apply the method according to claim 1.

12. A method of providing torque protection and thrust protection for at least one propeller of a hybrid helicopter, the hybrid helicopter including a lift rotor and at least one propeller, the hybrid helicopter including a control system connected to blades of the at least one propeller, the hybrid helicopter having a thrust control configured to generate an order for modifying a pitch of the blades, which order is transmitted to the control system, the blades of the at least one propeller being driven in rotation by a mechanical transmission system of the hybrid helicopter;
the method including the following step:
having the control system keep the pitch of the blades of the at least one propeller within at least one control envelope relating to a characteristic of the at least one propeller and defined by limits for the characteristic, the characteristic being a thrust generated by the at least one propeller or a torque exerted in the mechanical transmission system;
wherein the at least one control envelope is bounded by an upper limit and by a lower limit for the characteristic in a control diagram plotting the pitch of the blades of a propeller along the abscissa axis and the characteristic of the propeller up the ordinate axis, the control diagram including a set of curves for different forward speeds of the hybrid helicopter, and the step of having the control system keep the pitch within the at least one control envelope includes the following steps at each iteration:
keeping the pitch of the blades below the upper limit as a function of the forward speed of the hybrid helicopter; and
keeping the pitch of the blades above the lower limit as a function of the forward speed of the hybrid helicopter;
wherein, when the characteristic is the thrust, the step of having the control system keeps the pitch within the at least one control envelope includes the following steps at each iteration:
computing a maximum pitch ($\beta_{Thrust\text{-}max}$) for the blades relating to a maximum usable thrust for a current forward speed of the hybrid helicopter; and
computing a minimum pitch ($\beta_{Thrust\text{-}min}$) for the relating to a minimum usable thrust for the current forward speed of the hybrid helicopter,
and wherein, with the hybrid helicopter including a single propeller, the method of providing torque protection and thrust protection for at least one propeller of a hybrid helicopter includes the following steps at each iteration:
computing a maximum overall mean pitch ($\beta_{TCC\text{-}Complete\text{-}max}$) relating to the maximum usable thrust and to the maximum allowable torque for the propeller for the current forward speed of the hybrid helicopter, the maximum overall mean pitch ($\beta_{TCC\text{-}complete\text{-}max}$) of the propeller being defined as a function of the maximum pitch ($\beta_{Thrust\text{-}max}$) relating to the maximum usable thrust from the propeller and of the maximum pitch ($\beta_{Torque-max}$) of the propeller relating to the maximum allowable torque for the propeller; and computing a minimum overall mean pitch ($\beta_{TCC-Complete-min}$) relating to the minimum usable thrust and to the minimum allowable torque for the propeller for the current forward speed of the hybrid helicopter, the minimum overall mean pitch ($\beta_{TCC-complete-min}$) being defined as a function of the minimum pitch ($\beta_{Thrust-min}$) relating to the minimum usable thrust from the propeller and of the minimum pitch ($\beta_{Torque-min}$) relating to the minimum allowable torque for the propeller.

13. The method according to claim 12, wherein, with the control system including a control computer receiving at least one thrust control signal issued by the thrust control, and with the control computer controlling at least one actuator of the control system, keeping the pitch within the at least one control envelope includes a step of having the control computer control the at least one actuator as a function at least of a law stored in a memory as well as at least of the thrust control signal, of the maximum overall mean pitch ($\beta_{TCC-Complete-max}$) and of the minimum overall mean pitch ($\beta_{TCC-Complete-min}$).

14. The method according to claim 12, wherein the maximum overall mean pitch ($\beta_{TCC-Complete-max}$) is equal to the minimum value from among the maximum pitch ($\beta_{Thrust-max}$) relating to the maximum usable thrust from the at least one propeller and the maximum pitch ($\beta_{TCC-Torque-max}$) relating to the maximum allowable torque for the at least one propeller while the minimum overall mean pitch ($\beta_{TCC-complete-min}$) is equal to the maximum value from among the minimum pitch ($\beta_{Thrust-min}$) relating to the minimum usable thrust from the at least one propeller and the minimum pitch ($\beta_{Torque-min}$) relating to the minimum allowable torque for the at least one propeller.

15. The method according to claim 12, wherein the steps of computing the maximum overall mean pitch ($\beta_{TCC-Complete-max}$) and the minimum overall mean pitch ($\beta_{TCC-Complete-min}$) include a step of correcting the maximum pitch and the minimum pitch relating to the usable thrust, and of correcting the maximum pitch and the minimum pitch relating to the allowable torque, for a rate of yaw of the hybrid helicopter, for each of the first and second propellers, such that:

the first and second maximum pitches relating to the maximum usable thrust are replaced respectively by $$\beta_{L-Thrust-max} + \frac{r \cdot Y_p \cdot \pi}{180 \cdot k \cdot \Omega \cdot R}$$

and $$\beta_{R-Thrust-max} - \frac{r \cdot Y_p \cdot \pi}{180 \cdot k \cdot \Omega \cdot R};$$

the first and second maximum pitches relating to the maximum allowable torque are replaced respectively by $$\beta_{L-Torque-max} + \frac{r \cdot Y_p \cdot \pi}{180 \cdot k \cdot \Omega \cdot R}$$

and $$\beta_{R-Torque-max} - \frac{r \cdot Y_p \cdot \pi}{180 \cdot k \cdot \Omega \cdot R};$$

the first and second minimum pitches relating to the minimum usable thrust are replaced respectively by $$\beta_{L-Thrust-min} + \frac{r \cdot Y_p \cdot \pi}{180 \cdot k \cdot \Omega \cdot R}$$

and $$\beta_{R-Thrust-min} - \frac{r \cdot Y_p \cdot \pi}{180 \cdot k \cdot \Omega \cdot R};$$

the first and second minimum pitches relating to the minimum allowable torque are replaced respectively by $$\beta_{L-Torque-min} + \frac{r \cdot Y_p \cdot \pi}{180 \cdot k \cdot \Omega \cdot R}$$

and $$\beta_{R-Torque-min} - \frac{r \cdot Y_p \cdot \pi}{180 \cdot k \cdot \Omega \cdot R};$$

where:
r is the yaw rotation rate of the hybrid helicopter, expressed in degrees per second (°/s);
Yp is the yaw lever arm of the propellers, expressed in meters (m);
$\pi$ is a trigonometric constant;
$\Omega$ is the speed of rotation of the propellers, expressed in radians per second (rad/s);
R is the radius of the propellers, expressed in meters (m); and
k is a positive coefficient less than or equal to 1.

16. A method of providing torque protection and thrust protection for at least one propeller of a hybrid helicopter, the hybrid helicopter including a lift rotor and at least one propeller, the hybrid helicopter including a control system connected to blades of the at least one propeller, the hybrid helicopter having a thrust control configured to generate an order for modifying a pitch of the blades, which order is transmitted to the control system, the blades of the at least one propeller being driven in rotation by a mechanical transmission system of the hybrid helicopter;

the method including the following step:
having the control system keep the pitch of the blades of the at least one propeller within at least one control envelope relating to a characteristic of the at least one propeller and defined by limits for the characteristic, the characteristic being a thrust generated by the at least one propeller or a torque exerted in the mechanical transmission system;

wherein the at least one control envelope is bounded by an upper limit and by a lower limit for the characteristic in a control diagram plotting the pitch of the blades of a propeller along the abscissa axis and the characteristic of the propeller up the ordinate axis, the control diagram including a set of curves for different forward speeds of the hybrid helicopter, and the step of having the control system keep the pitch within the at least one control envelope includes the following steps at each iteration:

keeping the pitch of the blades below the upper limit as a function of the forward speed of the hybrid helicopter; and keeping the pitch of the blades above the lower limit as a function of the forward speed of the hybrid helicopter;

wherein, when the characteristic is the thrust, the step of having the control system keeps the pitch within the at least one control envelope includes the following steps at each iteration:

computing a maximum pitch ($\beta_{Thrust-max}$) for the to a maximum usable thrust for a current forward speed of the hybrid helicopter; and computing a minimum pitch ($\beta_{Thrust-min}$) for the to a minimum usable thrust for the current forward speed of the hybrid helicopter, and wherein, with the hybrid helicopter including at least two propellers, the method of providing torque protection and thrust protection for at least one propeller of a hybrid helicopter includes the following steps at each iteration:

computing a maximum overall mean pitch ($\beta_{TCC-Complete-max}$) relating to the maximum usable thrust and to the maximum allowable torque for the propellers for the current forward speed of the hybrid helicopter, the maximum overall mean pitch ($\beta_{TCC-complete-max}$) of the propellers being defined as a function of the maximum pitch ($\beta_{Thrust-max}$) relating to the maximum usable thrust from each of the propellers and of the maximum pitch ($\beta_{Torque-max}$) relating to the maximum allowable torque for each of the propellers; and computing a minimum overall mean pitch ($\beta_{TCC-Complete-min}$) relating to the minimum usable thrust and to the minimum allowable torque for the propellers for the current forward speed of the hybrid helicopter, the minimum overall mean pitch ($\beta_{TCC-complete-min}$) of the propellers being defined as a function of the minimum pitch ($\beta_{Thrust-min}$) relating to the minimum usable thrust from each of the propellers and of the minimum pitch ($\beta_{Torque-min}$) relating to the minimum allowable torque for each of the propellers.

17. The method according to claim 16, wherein, with the hybrid helicopter including a first propeller and a second propeller, and with the control system being connected to first blades of the first propeller and to second blades of the second propeller, the step of computing a maximum overall mean pitch ($\beta_{TCC-Complete-max}$) includes the following substeps:

measuring a first current pitch ($\beta_L$) of the first blades and a second current pitch ($\beta_R$) of the second blades;

computing a first maximum computation pitch relating to the maximum usable thrust for the first propeller using the following relationship:

$$\beta_{TCC-L-Thrust-max} = \frac{\beta_{L-Thrust-max} + \beta_R}{2},$$

where $\beta_{L-Thrust-max}$ is the maximum pitch of the first blades relating to the maximum usable thrust for the first propeller;

computing a second maximum computation pitch relating to the maximum usable thrust for the second propeller using the following relationship:

$$\beta_{TCC-R-Thrust-max} = \frac{\beta_L + \beta_{R-Thrust-max}}{2},$$

where $\beta_{R-Thrust-max}$ is the maximum pitch of the second blades relating to the maximum usable thrust for the second propeller;

computing a maximum computation mean pitch relating to the maximum usable thrust for the two propellers using the following relationship:

$$\beta_{TCC-Thrust-max-NODIFF} = \frac{\beta_{TCC-L-Thrust-max} + \beta_{TCC-R-Thrust-max}}{2};$$

computing a maximum mean pitch relating to the maximum usable thrust for the two propellers using the following relationship:

$$\beta_{TCC-Thrust-max} = \beta_{TCC-Thrust-max-NODIFF} - ABS$$
$$(\beta_{TCC-L-Thrust-max} - \beta_{TCC-R-Thrust-max})$$

where ABS is a function extracting the absolute value;

computing a first maximum computation pitch relating to the maximum allowable torque for the first propeller using the following relationship:

$$\beta_{TCC-L-Torque-max} = \frac{\beta_{L-Torque-max} + \beta_R}{2},$$

where $\beta_{L-Torque-max}$ is the maximum pitch of the first blades relating to the maximum allowable torque for the first propeller;

computing a second maximum computation pitch relating to the maximum allowable torque for the second propeller using the following relationship:

$$\beta_{TCC-R-Torque-max} = \frac{\beta_L + \beta_{R-Torque-max}}{2},$$

where $\beta_{R-Torque-max}$ is the maximum pitch of the second blades relating to the maximum allowable torque for the second propeller;

computing a maximum computation mean pitch relating to the maximum allowable torque for the two propellers using the following relationship:

$$\beta_{TCC-Torque-max-NODIFF} = \frac{\beta_{TCC-L-Torque-max} + \beta_{TCC-R-Torque-max}}{2};$$

computing a maximum mean pitch relating to the maximum allowable torque for the two propellers using the following relationship:

$$\beta_{TCC\text{-}Torque\text{-}max} = \beta_{TCC\text{-}Torque\text{-}max\text{-}NODIFF} - ABS(\Theta_{TCC\text{-}L\text{-}Torque\text{-}max} - \beta_{TCC\text{-}R\text{-}Torque\text{-}max});$$

computing the maximum overall mean pitch relating to the maximum usable thrust and to the maximum allowable torque for the two propellers using the following relationship:

$$\beta_{TCC\text{-}Thrust\text{-}max} = \text{MIN}(\beta_{TCC\text{-}Torque\text{-}max})$$

where MIN is a function extracting the minimum value from the two arguments provided as input; and the step of computing a minimum overall mean pitch ($\beta_{TCC\text{-}Complete\text{-}min}$) includes the following substeps:

measuring the first current pitch ($\beta_L$) of the first blades and the second current pitch ($\beta_R$) of the second blades;

computing a first minimum computation pitch relating to the minimum usable thrust for the first propeller using the following relationship:

$$\beta_{TCC\text{-}L\text{-}Thrust\text{-}min} = \frac{\beta_{L\text{-}Thrust\text{-}min} + \beta_R}{2},$$

where $\beta_{L\text{-}Thrust\text{-}min}$ is the minimum pitch of the first blades relating to the minimum usable thrust for the first propeller;

computing a second minimum computation pitch relating to the minimum usable thrust for the second propeller using the following relationship:

$$\beta_{TCC\text{-}R\text{-}Thrust\text{-}min} = \frac{\beta_L + \beta_{R\text{-}Thrust\text{-}min}}{2},$$

where $\beta_{R\text{-}Thrust\text{-}min}$ is the minimum pitch of the second blades relating to the minimum usable thrust for the second propeller;

computing a minimum computation mean pitch relating to the minimum usable thrust for the two propellers using the following relationship:

$$\beta_{TCC\text{-}Thrust\text{-}min\text{-}NODIFF} = \frac{\beta_{TCC\text{-}L\text{-}Thrust\text{-}min} + \beta_{TCC\text{-}R\text{-}Thrust\text{-}min}}{2};$$

computing a minimum mean pitch relating to the minimum usable thrust for the two propellers using the following relationship:

$$\Delta_{TCC\text{-}Thrust\text{-}min} = \beta_{TCC\text{-}Thrust\text{-}min\text{-}NODIFF} + ABS(\beta_{TCC\text{-}L\text{-}Thrust\text{-}min} - \beta_{TCC\text{-}R\text{-}Thrust\text{-}min});$$

computing a first minimum computation pitch relating to the minimum allowable torque for the first propeller using the following relationship:

$$\beta_{TCC\text{-}L\text{-}Torque\text{-}min} = \frac{\beta_{L\text{-}Torque\text{-}min} + \beta_R}{2},$$

where $\beta_{L\text{-}Torque\text{-}min}$ is the minimum pitch of the first blades relating to the minimum allowable torque for the first propeller;

computing a second minimum computation pitch relating to the minimum allowable torque for the second propeller using the following relationship:

$$\beta_{TCC\text{-}R\text{-}Torque\text{-}min} = \frac{\beta_L + \beta_{R\text{-}Torque\text{-}min}}{2},$$

where $\beta_{R\text{-}Torque\text{-}min}$ is the minimum pitch of the second blades relating to the minimum allowable torque for the second propeller;

computing a minimum computation mean pitch relating to the minimum allowable torque for the two propellers using the following relationship:

$$\beta_{TCC\text{-}Torque\text{-}min\text{-}NODIFF} = \frac{\beta_{TCC\text{-}L\text{-}Torque\text{-}min} + \beta_{TCC\text{-}R\text{-}Torque\text{-}min}}{2};$$

computing a minimum mean pitch relating to the minimum allowable torque for the two propellers using the following relationship:

$$\beta_{TCC\text{-}Torque\text{-}min} = \beta_{TCC\text{-}Torque\text{-}min\text{-}NODIFF} + ABS(\beta_{TCC\text{-}L\text{-}Torque\text{-}min} - \beta_{TCC\text{-}R\text{-}Torque\text{-}min});$$

computing the minimum overall mean pitch relating to the minimum usable thrust and to the minimum allowable torque for the two propellers Using the following relationship:

$$\beta_{TCC\text{-}Complete\text{-}min} = \text{MAX}(\beta_{TCC\text{-}Thrust\text{-}min}; \beta_{TCC\text{-}Torque\text{-}min})$$

where MAX is a function extracting the maximum value from the two arguments provided as input.

* * * * *